(12) United States Patent
Hori

(10) Patent No.: US 7,937,212 B2
(45) Date of Patent: May 3, 2011

(54) INTERNAL-COMBUSTION-ENGINE STOP DETERMINATION DEVICE

(75) Inventor: Yasuyoshi Hori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 223 days.

(21) Appl. No.: 12/275,408

(22) Filed: Nov. 21, 2008

(65) Prior Publication Data
US 2009/0265085 A1 Oct. 22, 2009

(30) Foreign Application Priority Data

Apr. 16, 2008 (JP) ................................. 2008-106866

(51) Int. Cl.
*F02N 11/08* (2006.01)
*G06F 19/00* (2011.01)
*G06G 7/70* (2006.01)
(52) U.S. Cl. ..................................... 701/112; 123/179.4
(58) Field of Classification Search .................. 701/112; 123/179.4, 179.1, 179.3
See application file for complete search history.

(56) References Cited

U.S. PATENT DOCUMENTS

| 5,646,841 | A  | * | 7/1997 | Suzuki et al. | .................... 701/1 |
| 6,839,621 | B2 | * | 1/2005 | Kaneko | ....................... 701/112 |
| 7,354,379 | B2 | * | 4/2008 | Moriya | ........................ 477/199 |
| 7,546,199 | B2 | * | 6/2009 | Kato | ............................. 701/112 |
| 7,801,672 | B2 | * | 9/2010 | Ueda | ............................ 701/112 |
| 2003/0150417 | A1 | * | 8/2003 | Miwa | ......................... 123/179.4 |
| 2007/0232444 | A1 | * | 10/2007 | Adachi | ........................... 477/74 |
| 2007/0272187 | A1 | * | 11/2007 | Celisse et al. | .............. 123/179.4 |

FOREIGN PATENT DOCUMENTS

| JP | 2001-263147 |  | 9/2001 |
| JP | 2003-515052 |  | 4/2003 |
| JP | 2007270768 A |  | 10/2007 |

* cited by examiner

*Primary Examiner* — Stephen K Cronin
*Assistant Examiner* — Sizo B Vilakazi
(74) *Attorney, Agent, or Firm* — Sughrue Mion, PLLC

(57) ABSTRACT

A device is provided with which it is made possible to rapidly determine that an internal combustion engine is in a stop state and to prevent an erroneous determination of starting. In a stop determination device provided with a detection unit that detects the rotation direction of the crankshaft of an internal combustion engine, it is determined that the internal combustion engine is in a stop state, in the case where a signal from the detection unit is not inputted for a predetermined time or in the case where a rotation-direction signal from the detection unit continuously reverses thrice or more times. Additionally, in the case where, from the detection unit, a signal of the same rotation direction is continuously inputted twice or more times, a determination that an internal combustion engine is in a stop state is cancelled.

6 Claims, 13 Drawing Sheets

FIG.3A
FORWARD ROTATION
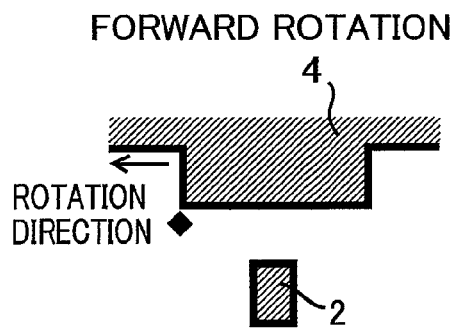
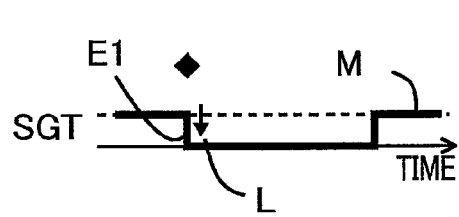
FIG.3B
BACKWARD ROTATION
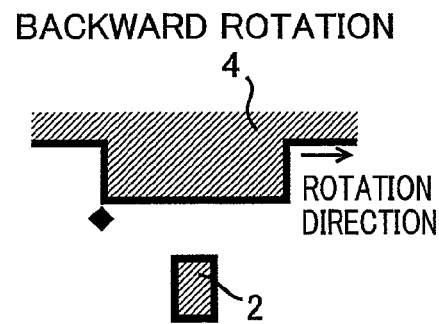
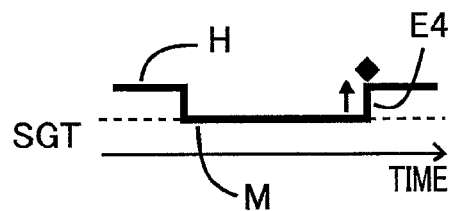
FIG.3C
PORTION MARKED WITH ♦ FORWARD TO BACKWARD
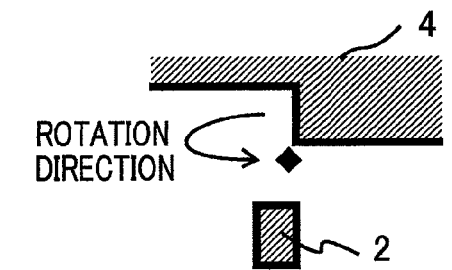
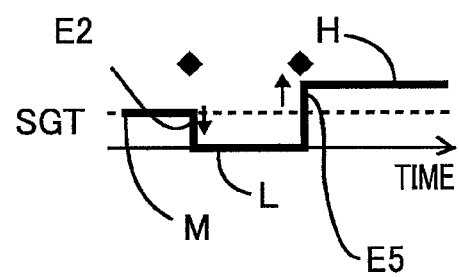
FIG.3D
PORTION MARKED WITH ♦ BACKWARD TO FORWARD
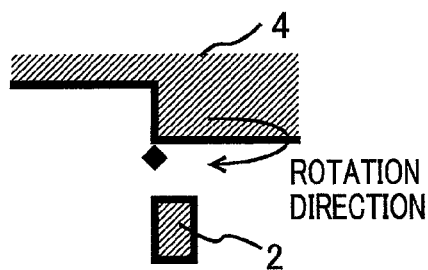
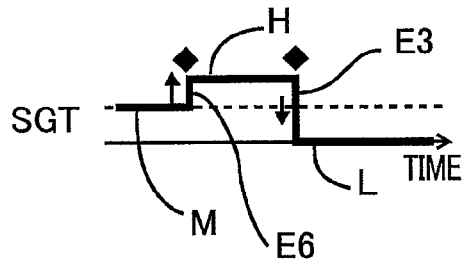

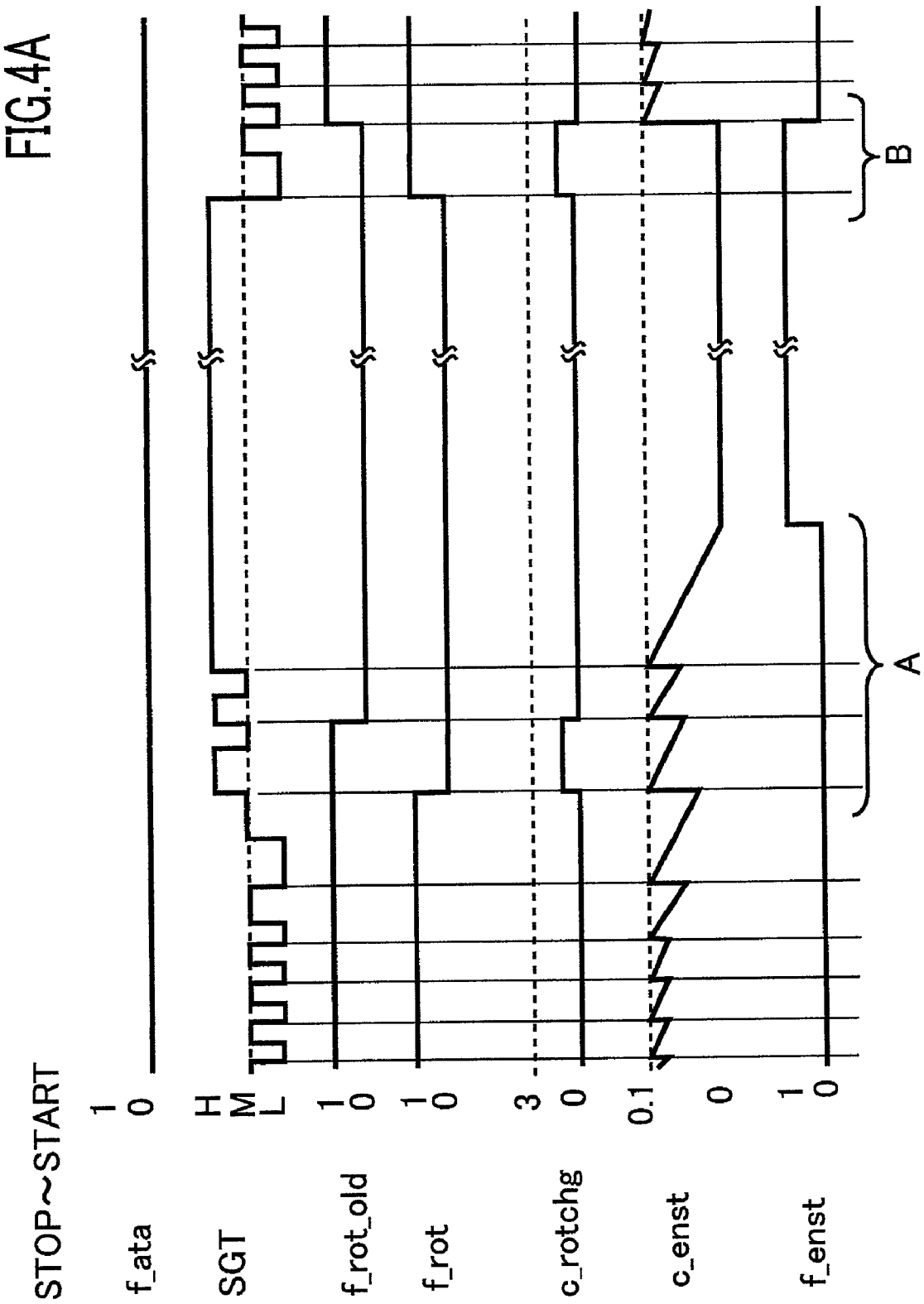

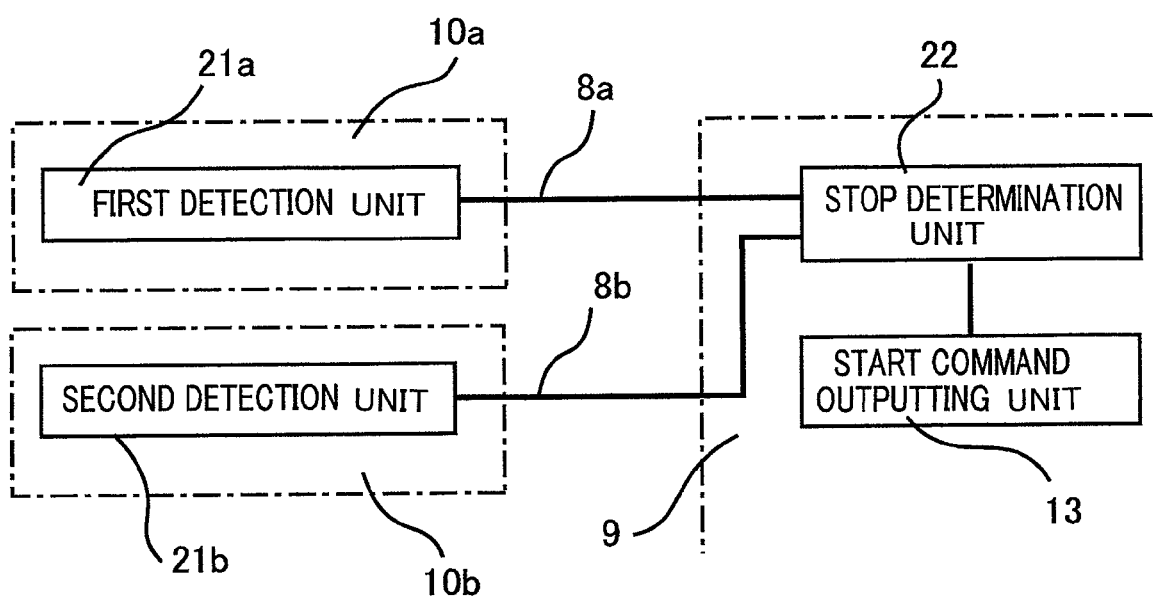

FIG.11

| FIRST SIGNAL EDGE DIRECTION | SECOND SIGNAL LEVEL | ROTATION DIRECTION OF GEAR-SHAPED MAGNETIC BODY 4 |
|---|---|---|
| FALLING | HIGH LEVEL | FORWARD ROTATION |
| RISING | | BACKWARD ROTATION |

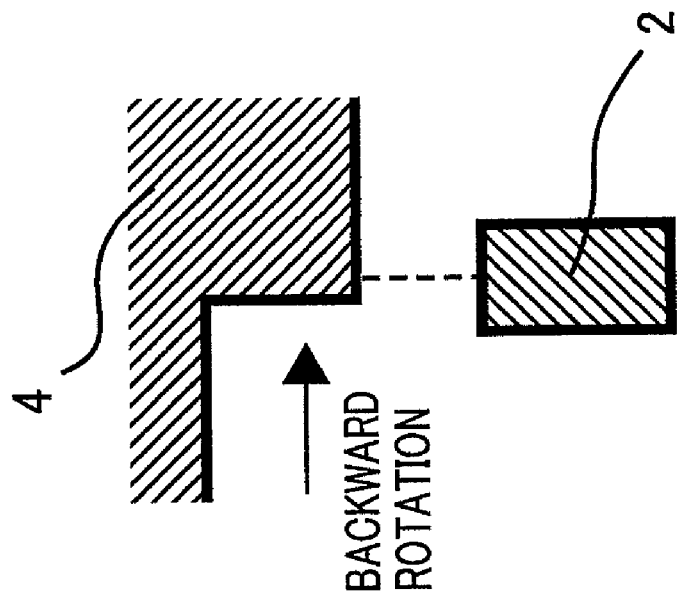
FIG.13B
DETECTION SUBJECT DETECTED
BACKWARD ROTATION
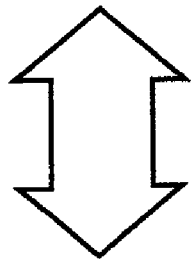
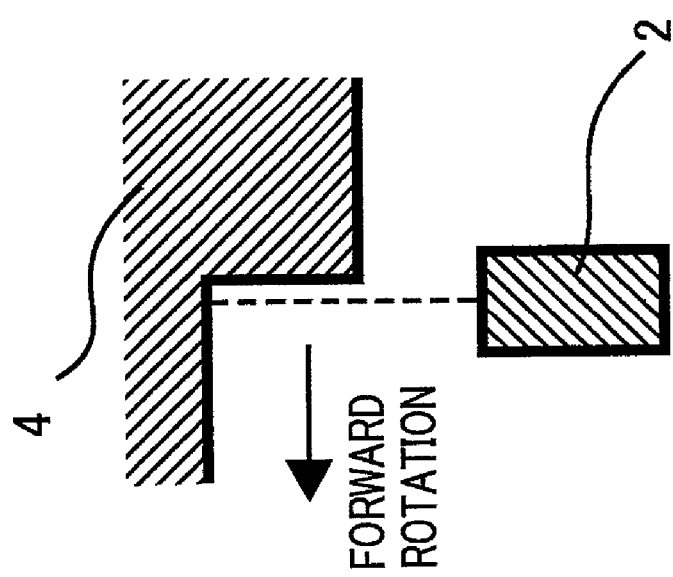
FIG.13A
DETECTION SUBJECT NOT DETECTED
FORWARD ROTATION

INTERNAL-COMBUSTION-ENGINE STOP DETERMINATION DEVICE

BACKGROUND OF THE INVENTION

1. Field of the Invention

The present invention relates to a stop determination device for determining whether or not an internal combustion engine is in a stop state.

2. Description of the Related Art

To date, internal-combustion-engine stop determination devices have been disclosed (e.g., refer to Japanese Patent Laid-Open No. 2001-263147) in which a rotation-direction detection unit for detecting the rotation direction of the crankshaft of an internal combustion engine is provided, and in the case where a backward rotation of the internal combustion engine is detected based on a signal from the rotation-direction detection unit, or in the case where the rotation speed of the internal combustion engine is lower than a reference value, it is determined that the internal combustion engine is in a stop state.

In a conventional internal-combustion-engine stop determination device disclosed in Japanese Patent Laid-Open No. 2001-263147, in the case where, upon a stop of an internal combustion engine, a backlash causes the crankshaft to rotate backward, a stop determination unit determines that the internal combustion engine has stopped; therefore, there exists no delay time that may occur with a stop determination method utilizing no rotation direction because that stop determination method cannot distinguish a signal upon a backward rotation due to a backlash from a signal upon a forward rotation, whereby it can rapidly be determined that the internal combustion engine has stopped, in response to an actual stop of the internal combustion engine.

Meanwhile, to date, internal combustion engines have been disclosed (e.g., refer to National Publication of International Patent Application No. 2003-515052) in which a combustion starting method is utilized in which a fuel is injected into a cylinder in a compression stroke and ignited so that the crank shaft is made to rotate backward and thereby the engine is started.

In the case of the internal-combustion-engine stop determination device disclosed in Japanese Patent Laid-Open No. 2001-263147, the usage mode and characteristics of a crank angle sensor that detects the rotation direction of a crankshaft causes the following anxieties: In the first place, a case will be considered in which, as illustrated in FIGS. 13A and 13B, while a detection subject 4 is situated in the vicinity of the detection coverage of a crank angle sensor 2, a backlash at the time when the internal combustion engine stops, a vibration at the time when the internal combustion engine is in a stop state, or the like causes the states of FIGS. 13A and 13B to be alternately repeated. In this case, the crank angle sensor 2, which does not detect the rotation direction of the crankshaft, cannot be utilized in a state in which the engine may rotate backward, for example, immediately before a stop of the engine; therefore, the conventional internal-combustion-engine stop determination device is configured in such a way that the detection subject 4 is not detected when the engine rotates at extremely low speed or in such a way that the crank angle sensor 2 is prohibited from outputting a signal. Accordingly, even in the case where the states of FIGS. 13A and 13B are alternately repeated, no signal is outputted, whereby a stop determination of an internal combustion engine can rapidly be performed, and even in the case where the foregoing case is caused by a vibration or the like after the internal combustion engine has stopped, the stop determination is continued and thereby no problem is caused.

However, in the case of the crank angle sensor 2 that detects the rotation direction of an internal combustion engine, especially, the crank angle sensor 2 for the purpose of detecting a stop position, the position of the detection subject 4 has to be accurately detected by a time instant when the engine stops, and also when the rotation direction reverses, the rotation speed temporarily becomes "0"; therefore, even in a stop state, the crank angle sensor 2 is required to output a signal. Accordingly, also when the states of FIGS. 13A and 13B are alternately repeated, a forward-rotation signal and a backward-rotation signal are alternately outputted; thus, with a conventional stop determination device, the stop determination is cancelled by the forward-rotation signal. As a result, the stop determination may be delayed, or the conventional stop determination device may erroneously determine that the internal combustion engine has restarted, whereby unnecessary starting control may be activated. Also when the foregoing state is caused by a vibration or the like after the internal combustion engine has stopped, the stop determination may be cancelled and thereby the conventional stop determination device may erroneously determine that the internal combustion engine has started.

In contrast, in the case of an internal combustion engine, disclosed in National Publication of International Patent Application No. 2003-515052, which employs a so-called combustion starting method in which a fuel is injected into a cylinder in a compression stroke and ignited so that the crank shaft is made to rotate backward and thereby the engine is started, the conventional stop determination device disclosed in Japanese Patent Laid-Open No. 2001-263147 may erroneously determine a state of reversal or a state of extremely low speed rotation as a state of stop, even though the internal combustion engine has been activated; thus, activation of internal-combustion-engine starting control may be delayed.

SUMMARY OF THE INVENTION

The present invention has been implemented in order to solve the foregoing problems in conventional internal-combustion-engine stop determination devices; the objective thereof is to obtain an internal-combustion-engine stop determination device that can accurately perform a determination that an internal combustion engine is in a stop state, cancellation of a determination that an internal combustion engine is in a stop state, or both the determination and the cancellation, even when a crankshaft vibration or the like exists.

An internal-combustion-engine stop determination device according to the present invention is provided with a detection subject that rotates in synchronization with a crankshaft of an internal combustion engine; a detection unit that detects a rotation direction of the crankshaft, based on rotation of the detection subject; and a stop determination unit that determines whether or not the internal combustion engine is in a stop state, based on a signal from the detection unit. The internal-combustion-engine stop determination device is characterized in that the detection unit is configured in such a way as to output a position-detection signal corresponding to a predetermined position on the detection subject and a rotation-direction detection signal corresponding to a rotation direction of the crankshaft, when detecting the predetermined position on the detection subject, and in that the stop determination unit is configured in such a way as to have at least one of the following functions (1) and (2):

(1) To determine that the internal combustion engine is in a stop state, in the case where the position-detection signal and the rotation-direction detection signal from the detection unit are not inputted for a predetermined time or in the case where the rotation-direction detection signal from the detection unit continuously reverses thrice or more times (2) To cancel a determination that the internal combustion engine is in a stop state, in the case where, from the detection unit, the rotation-direction detection signal of a same rotation direction is continuously inputted twice or more times.

In the internal-combustion-engine stop determination device according to the present invention, the stop determination unit is configured in such a way as to have at least one of the following functions:

(1) To determine that the internal combustion engine is in a stop state, in the case where the position-detection signal and the rotation-direction detection signal from the detection unit are not inputted for a predetermined time or in the case where the rotation-direction detection signal from the detection unit continuously reverses thrice or more times (2) To cancel a determination that the internal combustion engine is in a stop state, in the case where, from the detection unit, the rotation-direction detection signal of a same rotation direction is continuously inputted twice or more times.

Therefore, it is made possible to obtain an internal-combustion-engine stop determination device that can accurately perform a determination that an internal combustion engine is in a stop state, cancellation of a determination that an internal combustion engine is in a stop state, or both the determination and the cancellation, even when a crankshaft vibration or the like exists.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIGS. 3A to 3D are explanatory charts each representing the waveform of a rotation-information detection signal SGT in an internal-combustion-engine stop determination device according to Embodiment 1 of the present invention;

FIGS. 4A and 4B are timing charts each representing the behaviors of parameters in the case where there exists a change in the driving condition of a four-cylinder direct-injection internal combustion engine utilizing an internal-combustion-engine stop determination device according to Embodiment 1 of the present invention;

FIG. 9 is a conceptual block diagram illustrating first and second position detection sensors and a control unit in an internal-combustion-engine stop determination device according to Embodiment 2 of the present invention;

FIG. 11 is a table representing the relationships among a first signal, a second signal, and the rotation direction of a gear-shaped magnetic body in an internal-combustion-engine stop determination device according to Embodiment 2 of the present invention;

FIGS. 13A and 13B are explanatory charts explaining a state in which a detection subject is situated in the vicinity of the detection coverage of a sensor.

DETAILED DESCRIPTION OF THE PREFERRED EMBODIMENTS

Embodiment 1

Figure 1:
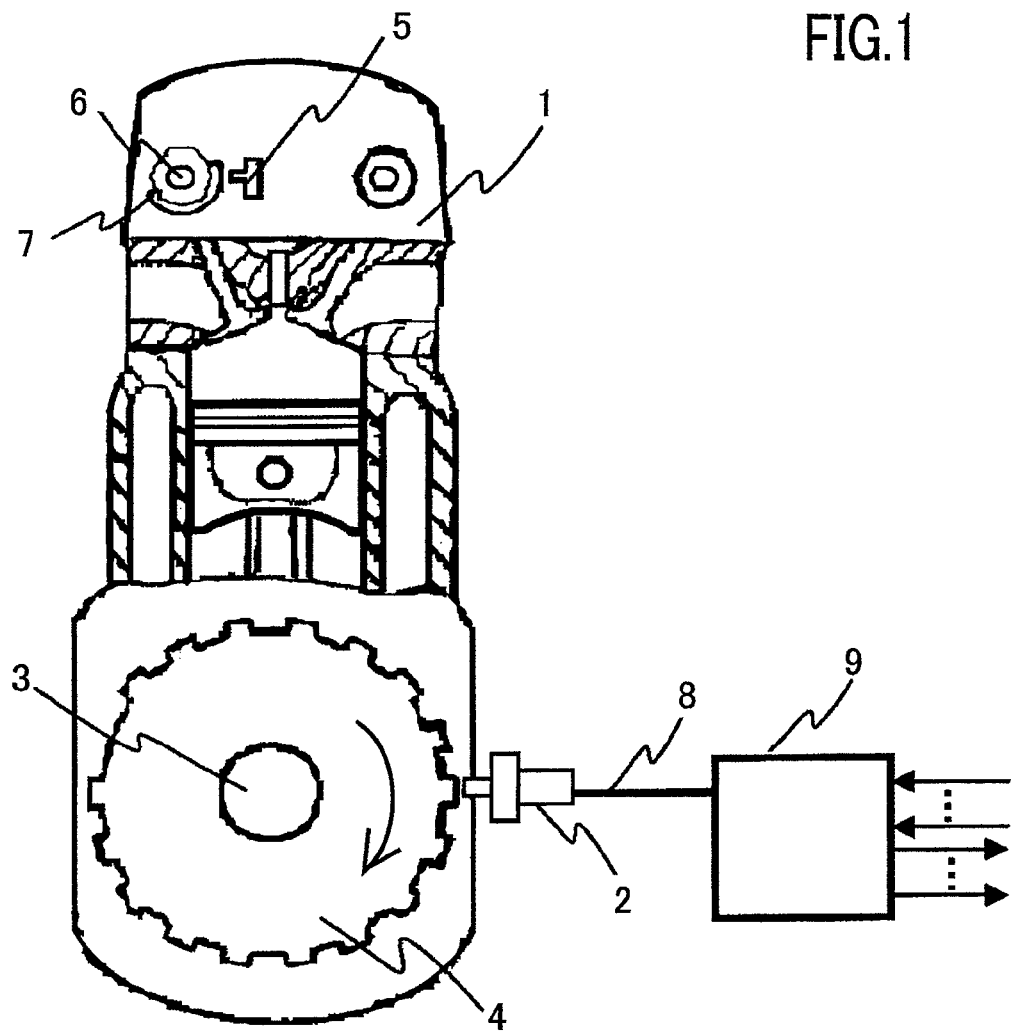
FIG. 1 is a configuration diagram illustrating the system configuration of a four-cylinder internal combustion engine utilizing an internal-combustion-engine stop determination device according to Embodiment 1 of the present invention.

Embodiment 1 of the present invention will be explained below with reference to the accompanying drawings. FIG. 1 is a diagram illustrating the system configuration of a four-cylinder internal combustion engine utilizing an internal-combustion-engine stop determination device according to Embodiment 1 of the present invention. In FIG. 1, a rotation-information detection sensor 2 as a unit for detecting the rotation direction of a crankshaft 3 of an internal combustion engine 1 detects a magnetic change caused by movement of teeth (protrusion portions) of a gear-shaped magnetic body 4 as a detection subject fixed on the crankshaft 3 and thereby outputs a rotation-information detection signal SGT for the crankshaft 3. The gear-shaped magnetic body 4 is fixed on the crankshaft 3; therefore, by detecting a predetermined position on and the rotation direction of the gear-shaped magnetic body 4 based on the rotation-information detection signal SGT from the rotation-information detection sensor 2, the angle and the rotation direction of the crankshaft 3 can be obtained. Letting the angle of the crankshaft 3 be represented in units of "CA.", totally 17 teeth each having a width of 10° CA. are formed in steps of 20° CA. in the gear-shaped magnetic body 4. Additionally, in Embodiment 1, letting first, second, third and fourth cylinders of an internal combustion engine be represented by #1, #2, #3, and #4, respectively, a tooth is missing in the portion of the gear-shaped magnetic body 4 ranging between the positions corresponding to 75° CA. and 105° CA. from the compression top dead centers of #1 and #4.

A cylinder discrimination sensor 5 that discriminates the cylinders from one another detects teeth of a magnetic body 7 fixed on a camshaft 6 and thereby outputs a cylinder discrimination signal. The camshaft 6 is connected to the crankshaft 3 by the intermediary of a mechanical transfer unit such as a timing belt and rotates once while the crankshaft 3 rotates twice. The magnetic body 7 has a projection with which the cylinder discrimination sensor 5 generates the cylinder discrimination signal having a high level during the duration from the timing of the compression top dead center of #1 and the timing of the compression top dead center of #4. Accordingly, based on whether the level of the cylinder discrimination signal corresponding to 105° CA. from the missing tooth of the gear-shaped magnetic body 4 is high or low, the stroke of each cylinder and the angle of the crankshaft can be determined. For example, in the case where the cylinder discrimination signal corresponding to 105° CA. from the missing tooth is high-level, it can be determined that the stroke of #1 is at 105° CA.

A signal line 8 that connects the rotation-information detection sensor 2 with a control unit 9 transmits the rotation-information detection signal SGT outputted by the rotation-information detection sensor 2 to the control unit 9. The control unit 9 includes a CPU, a memory, and the like; besides the rotation-information detection sensor 2, the cylinder discrimination sensor 5 and the like are connected to the control unit 9.

Figure 2:
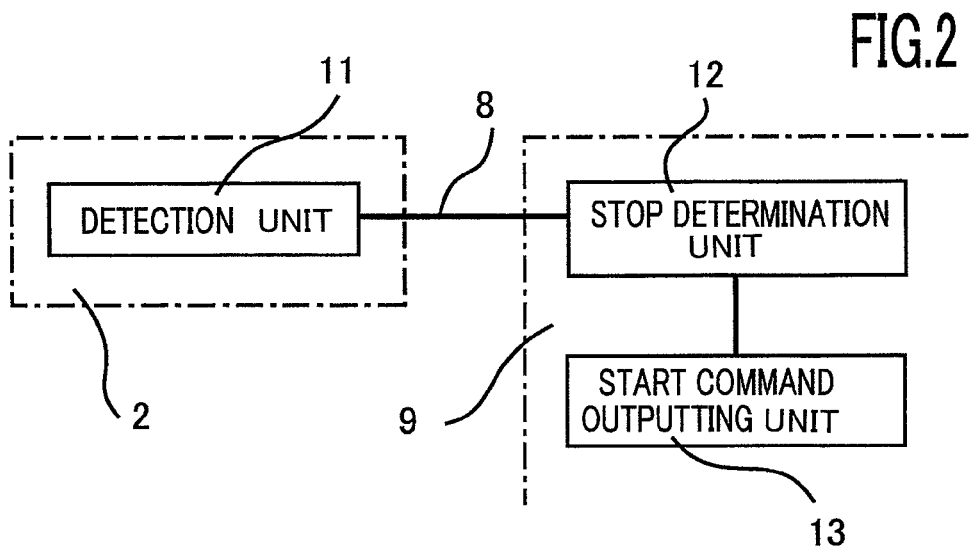
FIG. 2 is a conceptual block diagram illustrating the concepts of a rotation-information detection sensor and a control unit in an internal-combustion-engine stop determination device according to Embodiment 1 of the present invention.

FIG. 2 is a conceptual block diagram illustrating the concepts of the rotation-information detection sensor 2 and the control unit 9. In FIG. 2, a detection unit 11 formed of the rotation-information detection sensor 2 detects a magnetic change produced in accordance with movement of each tooth (protrusion portion) of the gear-shaped magnetic body 4 and outputs on the signal line 8 the rotation-information detection signal SGT including a rotation-direction detection signal that indicates the rotation direction of the crankshaft 3 obtained from determining the rotation direction of the gear-shaped magnetic body 4 based on the magnetic change and a position-detection signal that indicates a predetermined position of the crankshaft 3 at the time instant when the predetermined position on a tooth of the gear-shaped magnetic body 4 passes the rotation-information detection sensor 2. The position-detection signal is a signal corresponding to the predetermined angle of the crankshaft 3.

The rotation-information detection signal SGT outputted on the signal line 8 includes, as described above, the position-detection signal that corresponds to a predetermined angle of the crankshaft 3 and the rotation-direction detection signal that corresponds to the rotation direction of the crankshaft 3, and is inputted through the signal line 8 to a stop determination unit 12 provided in the control unit 9. FIGS. 3A to 3D are explanatory diagrams each representing the waveform of the rotation-information detection signal SGT; respective rotation states of the gear-shaped magnetic body 4, i.e., a forward-rotation state (FIG. 3A), a backward-rotation state (FIG. 3B), a state of reversal from forward rotation to backward rotation (FIG. 3C), and a state of reversal from backward rotation to forward rotation (FIG. 3D), in that order, are represented. The black diamond marks, on the gear-shaped magnetic body 4, represented in FIGS. 3A to 3D indicate respective predetermined positions on the teeth of the gear-shaped magnetic body 4.

As represented in FIG. 3A, in the case where the gear-shaped magnetic body 4 rotates forward and the black diamond mark passes the rotation-information detection sensor 2, the rotation-information detection signal SGT becomes a falling edge E1 ranging from a middle level M to a low level L; as represented in FIG. 3B, in the case where the gear-shaped magnetic body 4 rotates backward and the black diamond mark passes the rotation-information detection sensor 2, the rotation-information detection signal SGT becomes a rising edge E4 ranging from the middle level M to a high level H.

As represented in FIG. 3C, in the case where, before the rotation direction of the gear-shaped magnetic body 4 reverses from the forward to the backward direction, the gear-shaped magnetic body 4 rotates forward and the black diamond mark passes the rotation-information detection sensor 2, the rotation-information detection signal SGT becomes a falling edge E2 ranging from the middle level M to the low level L, as is the case with FIG. 3A; in the case where, after the rotation direction of the gear-shaped magnetic body 4 reverses from the forward to the backward direction, the gear-shaped magnetic body 4 rotates backward and the black diamond mark passes the rotation-information detection sensor 2, the rotation-information detection signal SGT becomes a rising edge E5 ranging from the low level L to the high level H. In contrast, as represented in FIG. 3D, in the case where, before the rotation direction of the gear-shaped magnetic body 4 reverses from the backward to the forward direction, the gear-shaped magnetic body 4 rotates backward and the black diamond mark passes the rotation-information detection sensor 2, the rotation-information detection signal SGT becomes a rising edge E6 ranging from the middle level M to the high level H, as is the case with FIG. 3B; in the case where, after the rotation direction of the gear-shaped magnetic body 4 reverses from the backward to the forward direction, the gear-shaped magnetic body 4 rotates forward and the black diamond mark passes the rotation-information detection sensor 2, the rotation-information detection signal SGT becomes a falling edge E3 ranging from the high level H to the low level L.

The position and the rotation direction of the gear-shaped magnetic body 4 can be determined based on the four kinds of edges E1, E2, E3, and E4 of the rotation-information detection signal SGT. That is to say, as represented in FIGS. 3A, 3C, and 3D, in the case where the rotation-information detection signal SGT becomes the falling edge E1, E2, or E3 that falls to the low level L, it can be determined that the gear-shaped magnetic body 4 rotates forward and the black diamond mark has passed the rotation-information detection sensor 2. Additionally, as represented in FIGS. 3B, 3C, and 3D, in the case where the rotation-information detection signal SGT becomes the rising edge E4, E5, or E6 that rises to the high level H, it can be determined that the gear-shaped magnetic body 4 rotates backward and the black diamond mark has passed the rotation-information detection sensor 2.

As discussed above, based on the falling edges E1, E2, and E3, of the rotation-information detection signal SGT, that fall to the low level L and the rising edges E4, E5, and E6, of the rotation-information detection signal SGT, that rise to the high level H, the position-detection signal and the rotation-direction detection signal can be obtained; therefore, as described later, the stop determination unit 12 can determine whether or not the internal combustion engine is in a stop state, based on the position-detection signal and the rotation-direction detection signal that are obtained from the rotation-information detection signal SGT.

A start command outputting unit 13 is to instruct the internal combustion engine to start; an instruction from the start command outputting unit 13 corresponds to a restart command issued after a stop of the internal combustion engine due to an instance that causes the internal combustion engine to automatically stop. The internal-combustion-engine starting method includes a combustion-starting method in which the engine is started by being once rotated backward through combustion, in addition to a starting method in which the engine is started through a starter in such a way as to rotate forward.

Figure 4B:
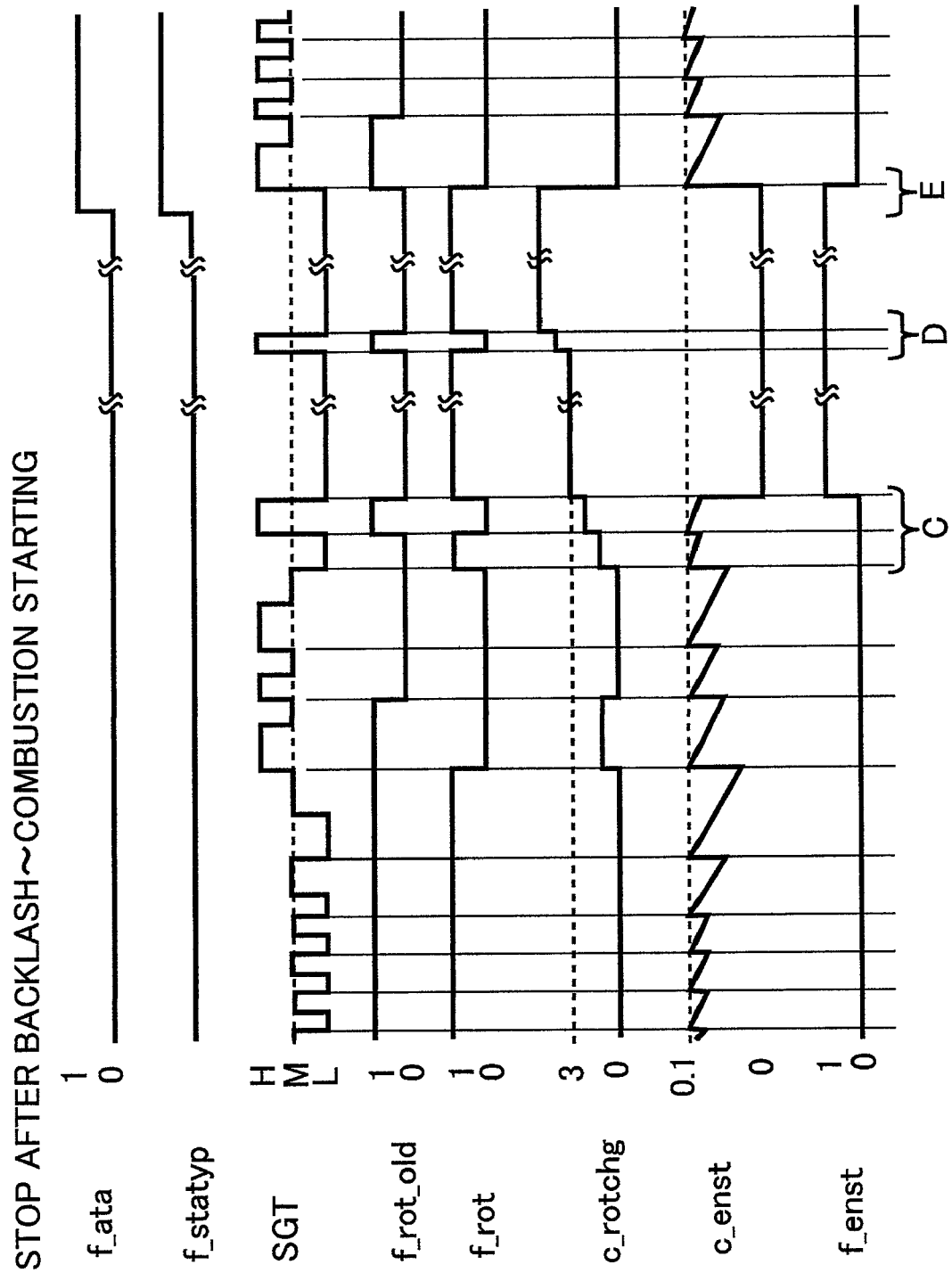

FIGS. 4A and 4B are timing charts each representing an example of the behaviors of parameters in the case where the driving condition of a four-cylinder direct-injection internal combustion engine changes; FIG. 4A is a timing chart in the case where an internal combustion engine being in a stop state is started through starter starting in such a way as to rotate forward; FIG. 4B is a timing chart in the case where the internal combustion engine being in a stop state is started in such a way as to rotate backward, through combustion starting that is accompanied by a backlash.

In FIGS. 4A and 4B, a start command flag f_sta outputted from the start command outputting unit 13 is set to "1" when an internal combustion engine is started, and cleared to "0" after the internal combustion engine has been started. A starting method flag f_statyp indicates a starting method for an internal combustion engine; the starting method flag f_statyp is set to "1" when the engine is started through combustion starting in such a way as to rotate backward and cleared to "0" when the engine is started through starter starting in such a way as to rotate forward.

The rotation-information detection signal SGT, which has been explained with reference to FIGS. 3A to 3D, is an output signal of the rotation-information detection sensor 2. A forward-rotation flag f_rot is set to "1" when the rotation-direction detection signal obtained from the rotation-information detection signal SGT indicates a forward rotation and cleared to "0" when the rotation-direction detection signal indicates a backward rotation. A previous forward-rotation flag f_rot old is a flag for which the value of the forward-rotation flag f_rot is substituted each time a rotation direction is obtained from the rotation-direction detection signal included in the rotation-information detection signal SGT; the previous rotation direction, which has been set in the forward-rotation flag f_rot through the previous rotation-direction detection signal, is retained in the previous forward-rotation flag f_rot_old.

A reversal counter value c_rotchg is counted up by "1" when, through the rotation-direction detection signal included in the rotation-information detection signal SGT, it is determined that the rotation direction has reversed, and cleared to "0" when the rotation direction does not change. It can be determined that the rotation direction has reversed, in the case where the forward-rotation flag f_rot and the previous forward-rotation flag f_rot_old are different from each other.

An engine-stall determination counter value c_enst is set to a predetermined time when the rotation-direction detection signal included in the rotation-information detection signal SGT is inputted to the engine-stall determination counter, and reduced as the time elapses. In Embodiment 1, the predetermined time is set to 0.1 second. However, in the case where, as in portions B, C, and D, described later, in FIGS. 4A and 4B, it is determined that the engine has stopped even though the rotation-direction detection signal included in the rotation-information detection signal SGT is inputted, the engine-stall determination counter value c_enst is cleared to "0". An engine stall flag f_enst is set to "1" when it is determined that the internal combustion engine has stopped, for example, when the engine-stall determination counter value c_enst becomes "0" after the predetermined time has elapsed. When it is determined that the engine has been started, the engine stall flag f_enst is cleared to "0".

In FIG. 4A, the A portion indicates a case in which the internal combustion engine stops after reversing its rotation direction. In this case, because the rotation-direction detection signal included in the rotation-information detection signal SGT is not inputted for the predetermined time, the engine-stall determination counter value c_enst becomes "0"; thus, it is determined that the internal combustion engine has stopped, and the engine stall flag f_enst is set to "1".

In FIG. 4A, the B portion indicates a case in which the start command flag f_sta is "0" and the engine is started. This case corresponds to a case in which a driver manipulates the starter switch so as to activate the starter, and the start command flag f_sta is "0"; therefore, because the forward-rotation flag f_rot and the previous forward-rotation flag f_rot_old become equal to each other, it is determined that the engine has started when the rotation-direction detection signal having the same rotation direction have continuously been inputted twice or more times, and the engine stall flag f_enst is cleared to "0".

In FIG. 4B, the portion C indicates a case where, after rotating backward, the engine stops while causing a so-called backlash in which, at the same predetermined position, the engine reverses its rotation direction from the forward to the backward direction and then again reverses its rotation direction from the backward to the forward direction. In this case, because reversal is repeated at the same predetermined position, the reversal counter value c_rotchg is not cleared but increases, and when the reversal counter value c_rotchg becomes "3", the engine stall flag f_enst is set to "1". Accordingly, without waiting until the predetermined time elapses, it can be determined that the internal combustion engine is in a stop state.

Next, in FIG. 4B, the portion D indicates a case in which, when, as represented in FIGS. 13A and 13B described above, the internal combustion engine is in a stop state under the condition that the black diamond mark on the gear-shaped magnetic body 4 is situated in the vicinity of the detection coverage of the rotation-information detection sensor 2, the rotation-direction detection signal included in the rotation-information detection signal SGT is inputted due to a vibration. In this case, because the start command flag f_sta is "0", it is not determined that the engine has started, unless the same rotation-direction detection signal is continuously inputted twice or more times; therefore, it is not determined that the engine has started and the engine stall flag f_enst remains to be "1", whereby an unnecessary determination of "start" can be prevented.

The potion E indicates a case where combustion starting, in which the start command flag f_sta becomes "1" and the starting method flag f_statyp is "1", is performed. In this case, because the position-detection signal is inputted while the engine rotates backward, it is determined that the engine has been activated, when the position-detection signal is firstly inputted, and the engine stall flag f_enst is cleared to "0".

Figure 5:
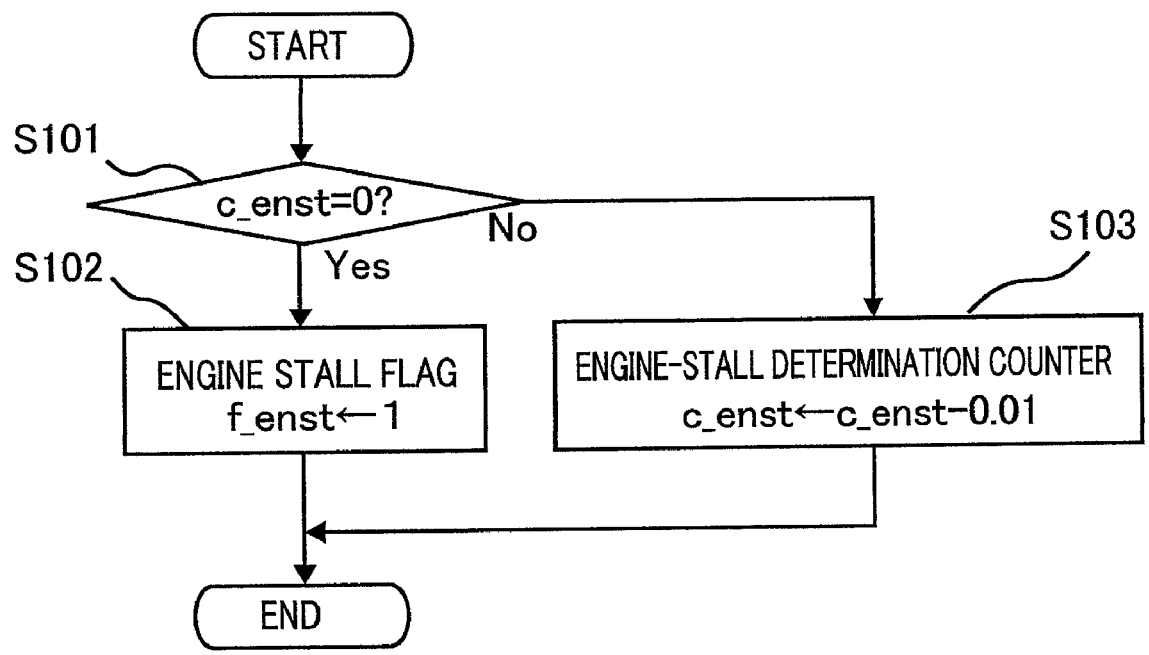
FIG. 5 is a flowchart for a processing routine in which calculation processing steps for parameters in an internal-combustion-engine stop determination device according to Embodiment 1 of the present invention are performed.

FIG. 5 is a flowchart for a processing routine in which calculation processing steps for the foregoing parameters are performed by the stop determination unit 12, in the cycle of 0.01 second. In FIG. 5, it is determined in the step S101 whether or not the engine-stall determination counter value c_enst is "0". In the case where the engine-stall determination counter value c_enst is "0", it is suggested that the predetermined time has elapsed from the time instant when the previous rotation-direction detection signal and the previous position-detection signal were inputted; therefore, the step S101 is followed by the step S102, where the engine stall flag f_enst is set to "1", and the processing is ended.

In contrast, in the case where the engine-stall determination counter value c_enst is not "0", "0.01", which corresponds to the calculation processing cycle of 0.01 sec., is subtracted from the engine-stall determination counter value c_enst in order to measure the predetermined time, and then the processing is ended. After that, by repeating the processing represented in FIG. 5, in the cycle of 0.01 sec., "0.01" is recurrently subtracted from the engine-stall determination counter value c_enst. In the case where, as a result, the engine-stall determination counter value c_enst reaches "0", it is suggested that the predetermined time has elapsed from the time instant when the previous rotation-direction detection signal and the previous position-detection signal were inputted; therefore, the process proceeds to the step S102, where the engine stall flag f_enst is set to "1", and then the processing is ended.

Figure 6:
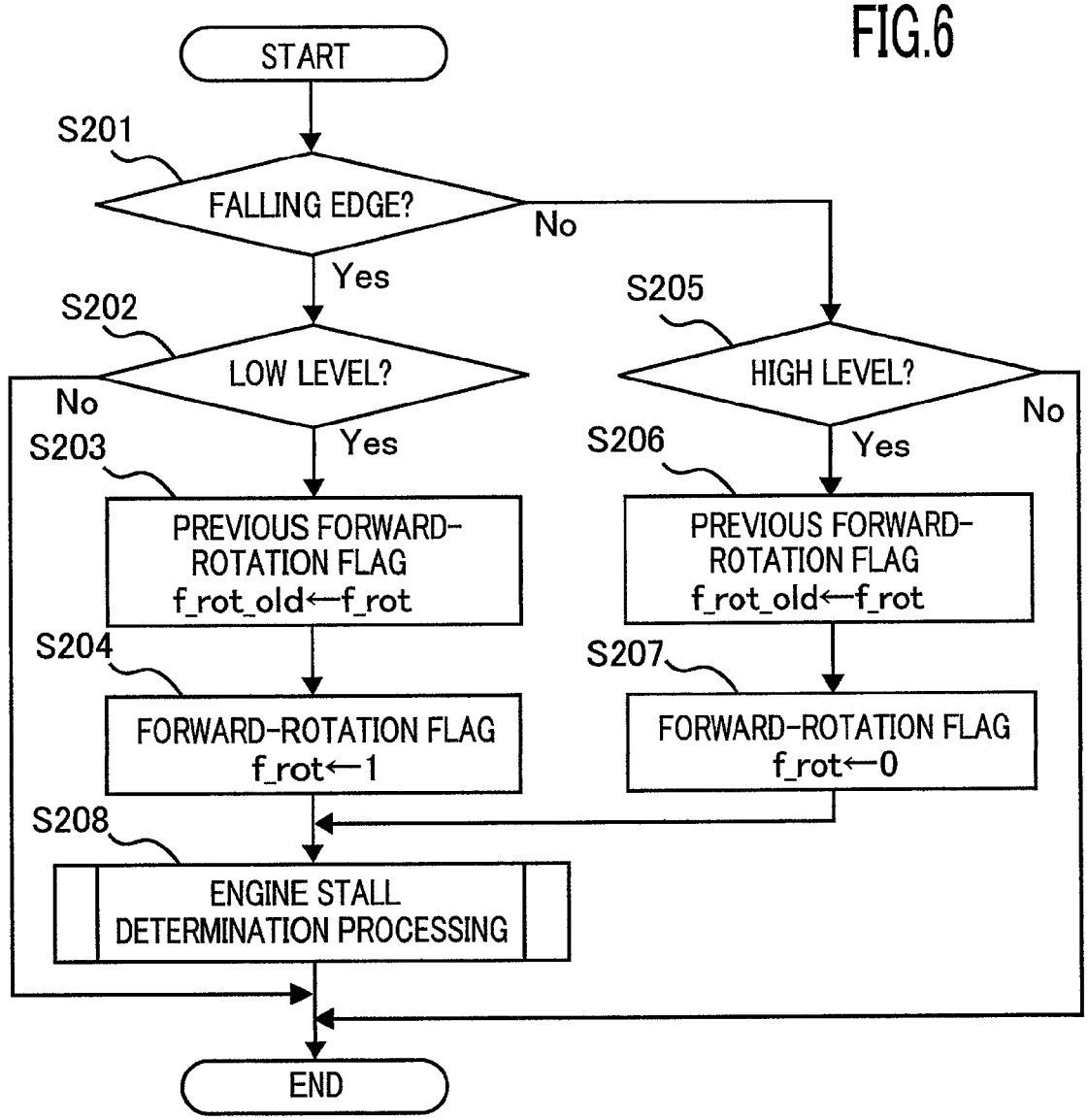
FIG. 6 is a flowchart representing edge synchronization processing of a rotation-information detection signal SGT performed by an internal-combustion-engine stop determination device according to Embodiment 1 of the present invention.

FIG. 6 is a flowchart representing processing performed by the stop determination unit 12 in synchronization with a rising edge or a falling edge of the rotation-information detection signal SGT. In FIG. 6, it is determined in the step S201 whether the edge of the rotation-information detection signal SGT is a falling edge or a rising edge. In the case where, as a result, it is determined that the edge of the rotation-information detection signal SGT is a falling edge, the step S201 is followed by the step S202, where it is determined whether or not the level of the rotation-information detection signal SGT is the low level L.

In the case where, in the step S202, it is determined that the level of the rotation-information detection signal SGT is the low level L, it is suggested that the edge of the inputted rotation-information detection signal SGT includes the rotation-direction detection signal indicating that the gear-shaped magnetic body 4 rotates forward and the position-detection signal obtained through detection of the predetermined position, i.e., the black diamond mark; therefore, the step S202 is followed by the step S203, where the value of the forward-rotation flag f_rot is substituted for the previous forward-rotation flag f_rot_old. Next, the step S203 is followed by the step S204, where the forward-rotation flag f_rot is set to "1"; after that, the step S204 is followed by the step S208, where an engine stall determination is performed, and then the processing is ended.

In the case where, in the step S202, it is determined that the level of the rotation-information detection signal SGT is other than the low level L, it is suggested that the edge of the inputted rotation-information detection signal SGT is not an edge at which the predetermined position is detected and does not include the position-detection signal; therefore, the processing is directly ended.

In contrast, in the case where, in the step S201, it is determined that the edge of the rotation-information detection signal SGT is a rising edge, the step S201 is followed by the step S205, where it is determined whether or not the level of the rotation-information detection signal SGT is the high level H.

In the case where, in the step S205, it is determined that the level of the rotation-information detection signal SGT is the high level H, it is suggested that the edge of the inputted rotation-information detection signal SGT includes the rotation-direction detection signal indicating that the gear-shaped magnetic body 4 rotates backward and the position-detection signal obtained through detection of the predetermined position; therefore, the step S205 is followed by the step S206, where the value of the forward-rotation flag f_rot is substituted for the previous forward-rotation flag f_rot_old, and then the step S206 is followed by the step S207. In the step S207, the forward-rotation flag f_rot is cleared to "0"; after that, as is the case with the forward rotation, the step S207 is followed by the step S208, where an engine stall determination processing is performed, and then the processing is ended.

In the case where, in the step S205, it is determined that the level of a rising edge of the rotation-information detection signal SGT is other than the high level H, it is suggested that the edge of the inputted rotation-information detection signal SGT is not an edge utilized for detecting the predetermined position and does not include the position-detection signal; therefore, the processing is directly ended.

Figure 7:
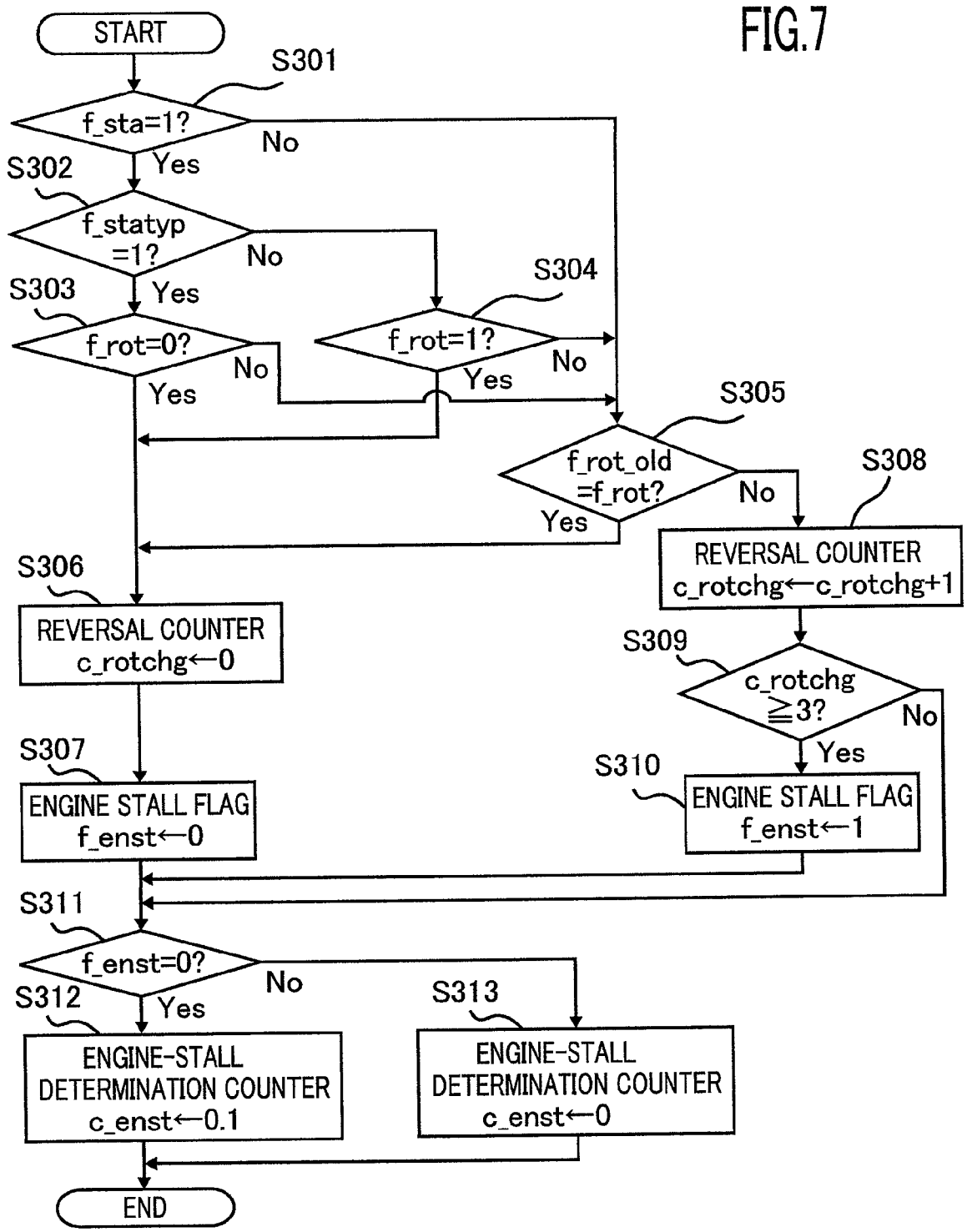
FIG. 7 is a flowchart representing engine stall determination processing performed by a stop determination unit 12 in an internal-combustion-engine stop determination device according to Embodiment 1 of the present invention.

FIG. 7 is a flowchart representing engine stall determination processing performed by the stop determination unit 12. The engine stall determination processing represented in FIG. 7 has two processing flows; one processing flow consisting of the steps S306 and S307 is processing performed when it is determined that the engine has been started; the other processing flow consisting of the steps S308 to S310 is performed in order to determine, based on the number of reversals, whether or not the internal combustion engine has stopped. The selection between the two processing flows is performed through the steps S301 to S305.

In FIG. 7, in the first place, it is determined in the step S301 whether or not the start command flag f_sta is "1". In the case where, as a result, it is determined that the start command flag f_sta is "1", it is suggested that the internal combustion engine has been started; therefore, in order to determine the rotation direction that enables a start determination utilizing the first detection signal to be performed, it is determined in the step S302 whether or not the starting method flag f_statyp is "1".

In the case where it is determined in the step S302 that the starting method flag f_statyp is "1", it is suggested that combustion starting has been performed, and the step S302 is followed by the step S303. In the step S303, it is determined whether or not the forward-rotation flag f_rot is "0"; in the case where the forward-rotation flag f_rot is "0", it is determined that the rotation direction of the internal combustion engine at the time when the rotation-information detection signal SGT is inputted is the backward direction, and the step S303 is followed by the step S306, so that the process proceeds to processing to be performed when it is determined that the engine has started.

In the case where it is determined in the step S302 that the starting method flag f_statyp is not "1", it is suggested that the starting method flag f_statyp is "0" and the internal combustion engine has been started through starter starting; thus, the step S302 is followed by the step S304. In the step S304, it is determined whether or not the forward-rotation flag f_rot is "1"; in the case where the forward-rotation flag f_rot is "1", it is determined that the rotation direction of the internal combustion engine at the time when the rotation-information detection signal SGT is inputted is the forward direction and the internal combustion engine has been started; thus, the step S304 is followed by the step S306, so that the process proceeds to processing to be performed when it is determined that the engine has started.

In contrast, in the case where it is determined in the step S301 that the start command flag f_sta is not "1" but "0", in the case where it is determined in the step S302 that the engine has been started through combustion starting, but it is determined in the step S303 that the rotation direction of the engine is not the backward direction, which corresponds to the combustion starting, but the forward direction, or in the case where it is determined in the step S302 that the engine has been started through starter starting, but it is determined in the step S304 that the rotation direction of the engine is not the forward direction, which corresponds to the starter starting, but the backward direction, the process proceeds to the step S305, where it is determined whether or not the rotation-direction detection signal of the same rotation direction has continuously been inputted twice or more times. In other words, it is determined in the step S305 whether or not the previous forward-rotation flag f_rot_old and the forward-rotation flag f_rot are equal to each other; in the case where the previous forward-rotation flag f_rot_old and the forward-rotation flag f_rot are equal to each other, it can be determined that the engine has been started; therefore, the step S305 is followed by the step S306. In the case where the previous forward-rotation flag f_rot_old and the forward-rotation flag f_rot are different from each other, the step S305 is followed by the step S308, so that the process proceeds to stop determination processing based on the number of reversals.

In the case where the process proceeds to the processing to be performed when it is determined that the engine has been started, the reversal counter value c_rotchg is cleared to "0" in the step S306 and the engine stall flag f_enst is cleared to "0" in the step S307, and then the process proceeds to the step S311.

In contrast, in the case where the process proceeds to the stop determination processing based on the number of reversals, the reversal counter value c_rotchg is counted up by "1" in the step S308, in order to count the number of reversals. Next, in the step S309, it is determined whether or not the number of reversals is three or more; in the case where c_rotchg≧3, it can be determined that the rotation-direction detection signal at the same predetermined position is recurrently inputted; thus, the step S309 is followed by the step S310, where the engine stall flag f_enst is set to "1", and the process proceeds to the step S311. In the case where it is determined in the step S309 that the reversal counter value c_rotchg is smaller than "3", the present engine stall flag f_enst is retained; thus, the process directly proceeds to the step S311.

In the step S311, it is determined whether or not the engine stall flag f_enst is "0"; in the case where the engine stall flag f_enst is "0", the engine-stall determination counter value c_enst is set to "0.01", which corresponds to the predetermined time, and then the processing is ended. In contrast, in the case where it is determined in the step S311 that the engine stall flag f_enst is not "0" but "1", it is suggested that the internal combustion engine is in a stop state; thus, the engine-stall determination counter value c_enst is cleared to "0", and then the processing is ended.

As described above, an internal-combustion-engine stop determination device according to Embodiment 1 of the present invention is configured in such a way that a detection unit outputs a position-detection signal corresponding to a predetermined position on the detection subject and a rotation-direction detection signal corresponding to a rotation direction of the crankshaft, when detecting the predetermined position on the detection subject, and in such a way that a stop determination unit determines that the internal combustion engine is in a stop state, in the case where the position-detection signal and the rotation-direction detection signal from the detection unit are not inputted for a predetermined time or in the case where the rotation-direction detection signal from the detection unit continuously reverses thrice or more times, and cancels a determination that the internal combustion engine is in a stop state, in the case where, from the detection unit, the rotation-direction detection signal of a same rotation direction is continuously inputted twice or more times.

Moreover, an internal-combustion-engine stop determination device according to Embodiment 1 of the present invention is configured in such a way that provision is made for a start command outputting unit that outputs a start command originated with a driver of a vehicle or with an automatic processing unit that automatically stops or starts the internal combustion engine, in accordance with a driving condition of the vehicle, and in such a way that, after receiving a start command from the start command outputting unit, the stop determination unit cancels a determination that the internal combustion engine is in a stop state, when the detection signal from the detection unit is inputted once.

Still moreover, an internal-combustion-engine stop determination device according to Embodiment 1 of the present invention is configured in such a way that, in the case where the internal combustion engine is started by use of a starter when the start command outputting unit outputs a start command, the stop determination unit cancels a determination that the internal combustion engine is in a stop state, only when the rotation-direction detection signal from the detection unit indicates that the crankshaft rotates forward.

Furthermore, an internal-combustion-engine stop determination device according to Embodiment 1 of the present invention is configured in such a way that the internal combustion engine can be started through a plurality of starting methods that are different from one another in the rotation direction of the crankshaft at the time when the internal combustion engine is started, and the stop determination unit cancels a determination that the internal combustion engine is in a stop state, only when the rotation-direction detection signal from the detection unit indicates the rotation direction, of the crankshaft, corresponding to the starting method, among the plurality of starting methods, which is adopted.

Still moreover, an internal-combustion-engine stop determination device according to Embodiment 1 of the present invention is configured in such a way that, in the case where, when the start command outputting unit outputs a start command, the internal combustion engine is made to rotate backward so as to be started by injecting a fuel into a cylinder of the internal combustion engine in a compression stroke, the stop determination unit cancels a determination that the internal combustion engine is in a stop state, only when the rotation-direction detection signal from the detection unit indicates that the crankshaft rotates backward.

In the foregoing internal-combustion-engine stop determination device according to the present invention, the stop determination unit determines that the internal combustion engine is in a stop state, in the case where the rotation-direction detection signal from the detection unit for detecting the rotation direction of the crankshaft continuously reverses thrice or more times; therefore, because, in the case where a signal related to the same detection subject is continuously inputted, a stop-state determination for the internal combustion engine is performed, a rapid stop determination can be performed. Accordingly, the internal-combustion-engine stop determination device according to the present invention can demonstrate effects in which, for example, wasteful operation can be suppressed, whereby energy is saved, and eventually, the safety of products and the environmental conservation are enhanced.

Moreover, in the case where, from the detection unit, a signal of the same rotation direction is continuously inputted twice or more times, the stop determination unit cancels a determination that the internal combustion engine is in a stop state; therefore, because a determination that the internal combustion engine is in a stop state is cancelled when a signal obtained through a different detection subject is inputted, activation of unnecessary starting control can be prevented.

Still moreover, after the start command outputting unit outputs a start command, the stop determination unit cancels a determination that the internal combustion engine is in a stop state, when a signal from the detection unit is inputted once; therefore, not only can activation of unnecessary starting control be prevented, but also a start determination can be accelerated.

Furthermore, because the stop determination unit limits signals from the detection unit, which cancels a stop-state determination, to a signal of a specific rotation direction in accordance with a starting method, the signals are limited to a signal that corresponds to a selected starting method; therefore, not only can activation of unnecessary starting control be prevented, but also a start determination can be accelerated.

Embodiment 2

In Embodiment 1 described above, the rotation-information detection sensor 2 capable of directly outputting the rotation-information detection signal SGT including the rotation-direction detection signal and the position-detection signal is utilized; however, in Embodiment 2, a stop determination device is configured with two position detection sensors each capable of detecting a tooth (protrusion portion) of the gear-shaped magnetic body 4 even when the engine is simply in a stop state. In this case, the rotation direction cannot be detected by only one of the position detection sensors; however, the rotation direction can be obtained by unit of a combination of signals outputted from the two sensors. An internal-combustion-engine stop determination device according to Embodiment 2 will be explained below with reference to the drawings.

Figure 8:
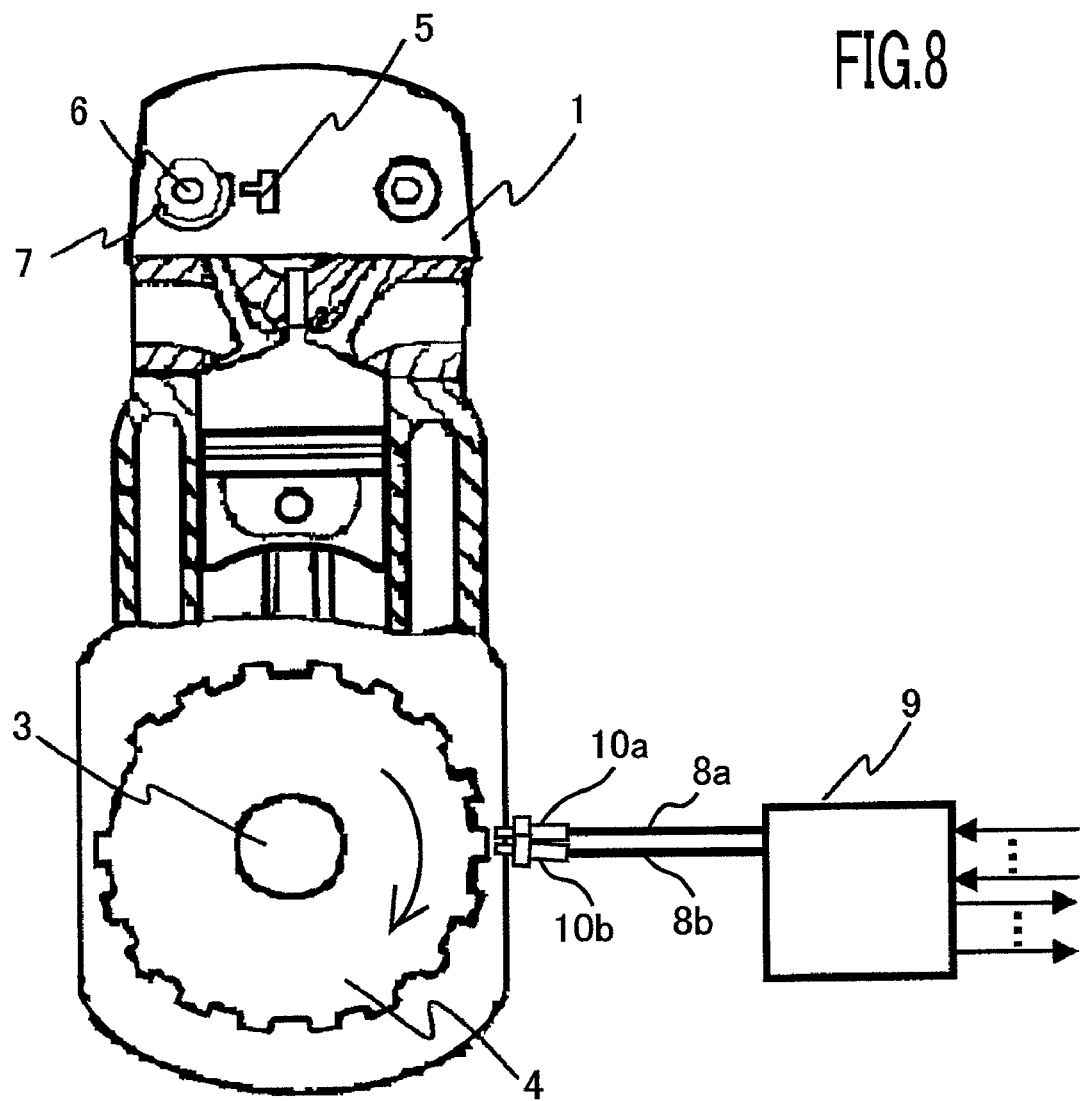
FIG. 8 is a configuration diagram illustrating the system configuration of a four-cylinder internal combustion engine utilizing an internal-combustion-engine stop determination device according to Embodiment 2 of the present invention.

FIG. 8 is a diagram illustrating the system configuration of a four-cylinder internal combustion engine utilizing an internal-combustion-engine stop determination device according to Embodiment 2 of the present invention. In FIG. 8, a first position detection sensor 10a and a second position detection sensor 10b each output a signal according to the position of a tooth (protrusion portion) of the gear-shaped magnetic body 4, based on a magnetic change caused by movement of the tooth (protrusion portion) of the gear-shaped magnetic body 4 fixed on the crankshaft 3; the first and second position detection sensors 10a and 10b are mounted arranged in the rotation direction of the gear-shaped magnetic body 4 in such a way as to be spaced apart from each other by 5° CA. of the crankshaft 3. A first signal line 8a connects the first position detection sensor 10a with the control unit 9, and a second signal line 8b connects the second position detection sensor 10b with the control unit 9. Other configurations are the same as those in Embodiment 1.

FIG. 9 is a conceptual block diagram illustrating the first and second position detection sensors 10a and 10b and the control unit 9. In FIG. 9, the first and second position detection sensors 10a and 10b that form a first detection unit 21a and a second detection unit 21b, respectively, detect each tooth (protrusion portion) of the gear-shaped magnetic body 4 and output a first signal S1 and a second signal S2, respectively. As explained below, a predetermined position on and the rotation direction of the gear-shaped magnetic body 4 can be detected through a combination of the first and second signals S1 and S2; a rotation-information detection unit is configured by combining the first and second detection unit 21a and 21b.

Figure 10B:
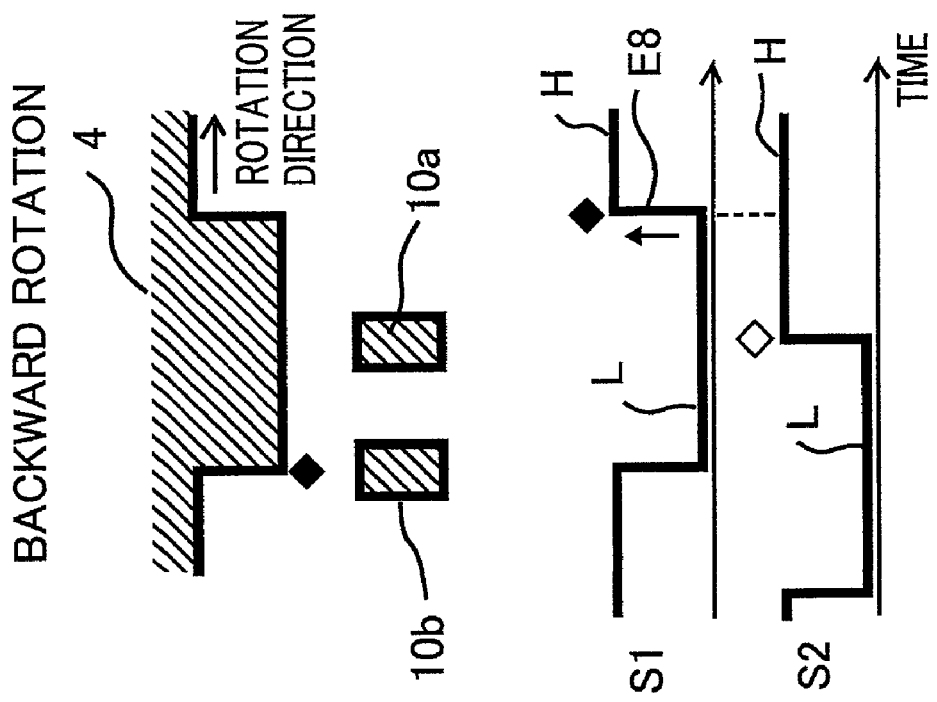
FIGS. 10A and 10B are explanatory charts each representing the waveforms of first and second signals in an internal-combustion-engine stop determination device according to Embodiment 2 of the present invention.
Figure 10A:
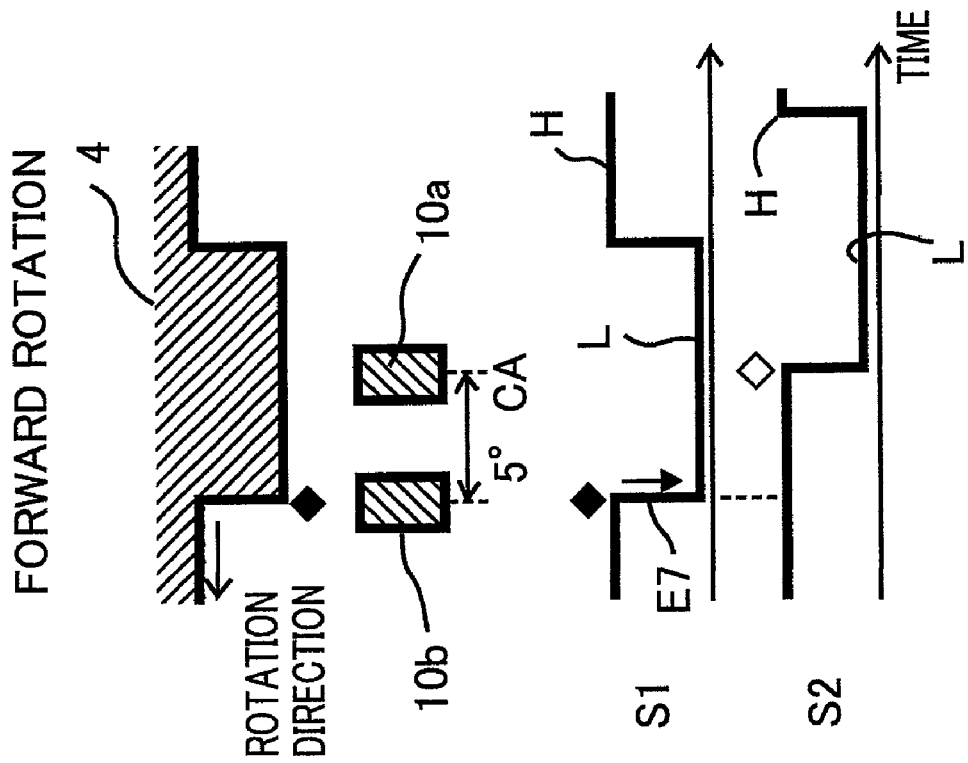

The first and second signals S1 and S2 are inputted to a stop determination unit 22 provided in the control unit 9, by way of the first and second signal lines 8a and 8b, respectively. FIGS. 10A and 10B are explanatory diagrams each representing the waveforms of the first and second signals S1 and S2; respective rotation states of the gear-shaped magnetic body 4, i.e., a forward-rotation state (FIG. 10A) and a backward-rotation state (FIG. 10B) are represented. The black diamond marks, on the gear-shaped magnetic body 4, represented in FIGS. 10A and 10B indicate respective predetermined positions on the teeth of the gear-shaped magnetic body 4. The black diamond mark in the first signal S1 indicates a position corresponding to a predetermined position, which is the black diamond mark on a tooth of the gear-shaped magnetic body 4. The white diamond mark in the second signal S2 indicates, for the sake of reference, the position corresponding to the predetermined position, which is the black diamond on a tooth of the gear-shaped magnetic body 4.

As represented in FIGS. 10A and 10B, the first and second position detection sensors 10a and 10b output the first signal S1 and the second signal S2, respectively, that each become the low level L when each tooth (protrusion portion) of the gear-shaped magnetic body 4 is detected and that each become the high level H in other cases.

As represented in FIG. 10A, when the engine rotates forward, each tooth (protrusion portion) of the gear-shaped magnetic body 4 is detected by the first position detection sensor 10a earlier than by the second position detection sensor 10b; therefore, at the timing of a falling edge E7, of the first signal S1, corresponding to the black diamond mark, the second signal S2 is kept to be the high level H. When the engine rotates backward, each tooth (protrusion portion) of the gear-shaped magnetic body 4 passes the second position detection sensor 10b earlier than the first position detection sensor 10a; therefore, at the timing of a rising edge E8, of the first signal S1, corresponding to the black diamond mark on the gear-shaped magnetic body 4, the second signal S2 is the high level H.

As described above, the edge E8 of the first signal S1 inputted while the second signal S2 is the high level H corresponds to the predetermined position on the gear-shaped magnetic body 4, i.e., the black diamond mark; further, depending on whether the edge of the first signal S1 is a rising edge or a falling edge, the rotation direction of the gear-shaped magnetic body 4 can be determined. FIG. 11 is a table summarizing the relationships among the first signal S1, the second signal S2, and the rotation direction of the gear-shaped magnetic body 4. As described above, in the stop determination unit 22, the position-detection signal indicating the predetermined position and the rotation-direction detection signal can be obtained based on the first and second signals, and based on the position-detection signal and the rotation-direction detection signal, it can be determined whether or not an internal combustion engine is in a stop state. In addition, the start command outputting unit 13 illustrated in FIG. 9 is the same as that in Embodiment 1.

Figure 12:
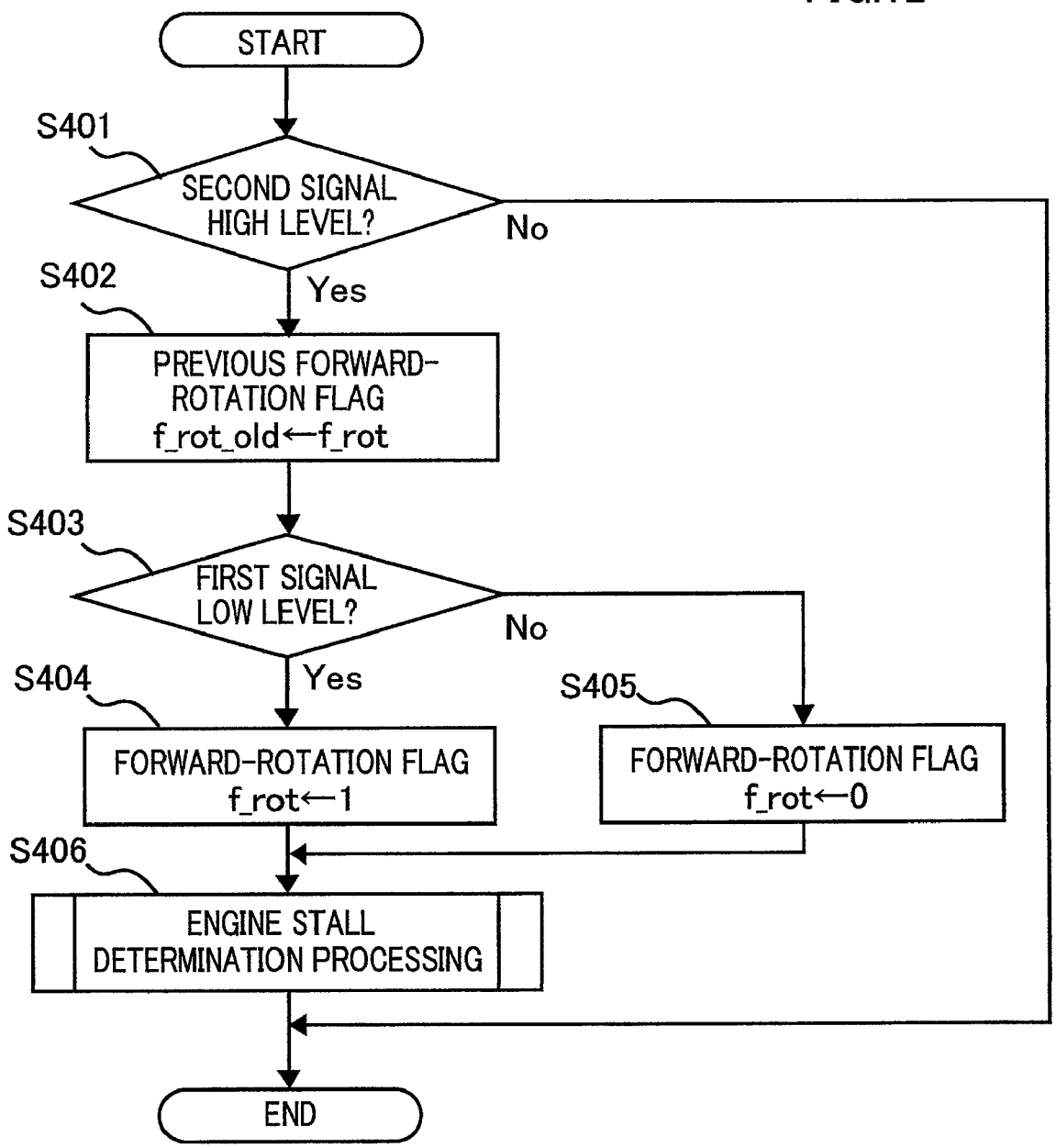
FIG. 12 is a flowchart representing edge synchronization processing of a first signal performed by an internal-combustion-engine stop determination device according to Embodiment 2 of the present invention.

FIG. 12 is a flowchart, different from that in Embodiment 1, representing processing performed by the stop determination unit 22, in synchronization with a rising edge or a falling edge of the first signal S1. In addition, the calculation processing steps for parameters performed in a constant cycle of 0.01 sec. are the same as those in the flowchart represented in FIG. 5 in Embodiment 1. Additionally, engine stall determination processing performed in the step S406 in the flowchart represented in FIG. 12 is the same as that in the flowchart represented in FIG. 7 in Embodiment 1.

In FIG. 12, in the first place, it is determined in the step S401 whether or not the second signal S2 is the high level H. In the case where the second signal S2 is the high level H, because the edge of the inputted first signal S1 corresponds to the predetermined position on the gear-shaped magnetic body 4, i.e., the black diamond mark, processings after and including the step S402 are performed. In contrast, in the case where it is determined in the step S401 that the second signal S2 is the low level L, the edge of the inputted first signal S1 does not correspond to the predetermined position on the gear-shaped magnetic body 4, i.e., the black diamond mark; therefore, the processing is ended.

In the step S402, the value of the forward-rotation flag f_rot is substituted for the previous forward-rotation flag f_rot_old; then, in order to determine the rotation direction, the step 402 is followed by the step S403, where it is determined whether or not the first signal S1 is the low level L. In the case where the first signal S1 is the low level L, because the edge of the inputted first signal is a falling edge, it can be determined that the engine rotates forward; thus, in the step S404, the forward-rotation flag f_rot is set to "1". In the case where it is determined in the step S403 that the first signal S1 is the high level H, because the edge of the inputted first signal S1 is a rising edge, it can be determined that the engine rotates backward; thus, in the step S405, the forward-rotation flag f_rot is cleared to "0". After that, the process proceeds to the step S406, where an engine stall determination processing the same as that in Embodiment 1 is performed in accordance with the flowchart represented in FIG. 7, and then the processing is ended.

The foregoing internal-combustion-engine stop determination device according to Embodiment 2 of the present invention can demonstrate the same effect as that of Embodiment 1, by use of sensors that are simply configured.

In Embodiments 1 and 2, the state of the starter switch is not inputted to the control unit 9; however, in the case where the state of the starter switch is inputted to the control unit 9, the start command flag f_sta may be set to "1" also when the starter is activated. In this situation, as a case where the engine is started while the start command flag f_sta is "0", a case is conceivable in which, due to a failure, no signal indicating the state of the starter switch is transferred to the control unit 9.

Various modifications and alterations of this invention will be apparent to those skilled in the art without departing from the scope and spirit of this invention, and it should be understood that this is not limited to the illustrative embodiments set forth herein.

What is claimed is:

1. An internal-combustion-engine stop determination device comprising:
    a detection subject that rotates in synchronization with a crankshaft of an internal combustion engine;
    a detection unit that outputs a position-detection signal corresponding to a predetermined position on the detection subject when detecting the predetermined position on the detection subject and that outputs a rotation-direction detection signal whose output status changes in accordance with a rotation direction of the crankshaft; and
    a stop determination unit that is programmed to operate based on the rotation-direction detection signal from the detection unit and determines that the internal combustion engine is in a stop state in the case where the rotation-direction detection signal continuously reverses thrice or more times.

2. The internal-combustion-engine stop determination device according to claim 1, further comprising a start command outputting unit that outputs a start command originated with a driver of a vehicle or with an automatic processing unit that automatically stops or starts the internal combustion engine, in accordance with a driving condition of the vehicle, wherein, after receiving a start command from the start command outputting unit, the stop determination unit cancels a determination that the internal combustion engine is in a stop state, when the detection signal from the detection unit is inputted once.

3. The internal-combustion-engine stop determination device according to claim 1, further comprising a start command outputting unit that outputs a start command originated with a driver of a vehicle or with an automatic processing unit that automatically stops or starts the internal combustion engine, in accordance with a driving condition of the vehicle, wherein, in the case where the internal combustion engine is started by use of a starter when the start command outputting unit outputs a start command, the stop determination unit cancels a determination that the internal combustion engine is in a stop state, only when the rotation-direction detection signal from the detection unit indicates that the crankshaft rotates forward.

4. The internal-combustion-engine stop determination device according to claim 1, further comprising a start command outputting unit that outputs a start command originated with a driver of a vehicle or with an automatic processing unit that automatically stops or starts the internal combustion engine, in accordance with a driving condition of the vehicle, wherein the internal combustion engine is configured in such a way as to be able to be started through a plurality of starting methods that are different from one another in the rotation direction of the crankshaft when the internal combustion engine is started, and the stop determination unit cancels a determination that the internal combustion engine is in a stop state, only when the rotation-direction detection signal from the detection unit indicates the rotation direction, of the crankshaft, corresponding to the starting method, among the plurality of starting methods, which is adopted.

5. The internal-combustion-engine stop determination device according to claim 1, further comprising a start command outputting unit that outputs a start command originated with a driver of a vehicle or with an automatic processing unit that automatically stops or starts the internal combustion engine, in accordance with a driving condition of the vehicle, wherein the internal combustion engine is configured in such a way as to be able to be started through a plurality of starting methods that are different from one another in the rotation direction of the crankshaft when the internal combustion engine is started, and
    in the case where the internal combustion engine is made to rotate backward to be started through a method, among the plurality of methods, of injecting a fuel into a cylinder of the internal combustion engine in a compression stroke when the start command outputting unit outputs a start command, the stop determination unit cancels a determination that the internal combustion engine is in a stop state, only when the rotation-direction detection signal from the detection unit indicates that the crankshaft rotates backward.

6. The internal-combustion-engine stop determination device according to claim 1, wherein the stop determination unit cancels a determination that the internal combustion engine is in a stop state, in the case where the rotation-direction detection signal of a same rotation direction is continuously inputted twice or more times.

* * * * *